H. G. NORWOOD.
NUT LOCK.
APPLICATION FILED MAY 19, 1919.

1,319,894.

Patented Oct. 28, 1919.

Inventor
Harry G. Norwood

By J. H. Dowling
Attorney

UNITED STATES PATENT OFFICE.

HARRY G. NORWOOD, OF BALTIMORE, MARYLAND, ASSIGNOR OF SIXTY PER CENT. TO GWYLLYM R. HOLMES AND TWENTY-FIVE PER CENT. TO WALTER J. WISCH, BOTH OF BALTIMORE, MARYLAND.

NUT-LOCK.

1,319,894.  Specification of Letters Patent.  Patented Oct. 28, 1919.

Application filed May 19, 1919. Serial No. 298,054.

*To all whom it may concern:*

Be it known that I, HARRY G. NORWOOD, a citizen of the United States of America, residing at Baltimore and State of Maryland, have invented certain new and useful Improvements in Nut-Locks, of which the following is a specification.

This invention relates to certain new and useful improvements in nut locks and has particular reference to an improved form of washer adapted for reception upon a bolt and constructed so as to effectively prevent turning of a nut threaded upon said bolt.

The primary object of the present invention is to provide means for readily and effectively locking nuts against turning, said means being so constructed as to render unnecessary any modification of the nut or bolt such as the provision of grooves or the like.

With the above general object in view and others that will become apparent as the nature of the invention is better understood, the same consists in the novel form, combination and arrangement of parts hereinafter more fully described, shown in the accompanying drawing and claimed.

Figure 2:
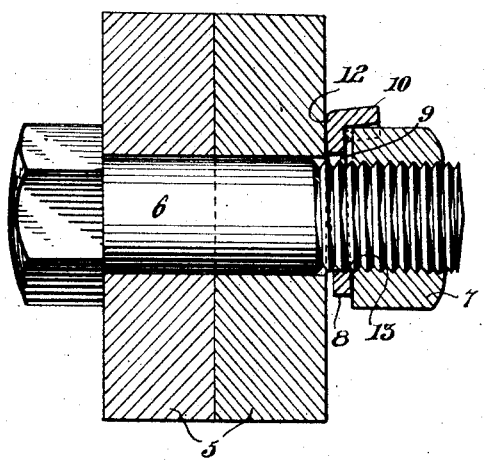
Figure 1:
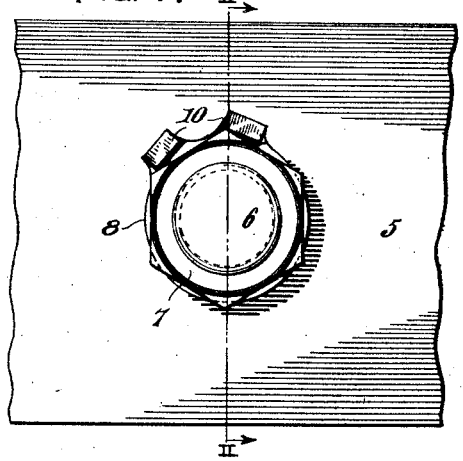
Figure 4:
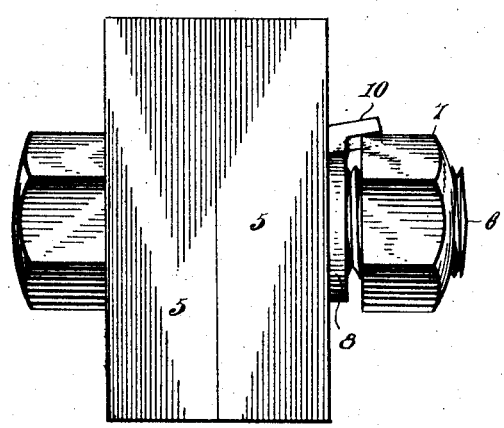
Figure 3:
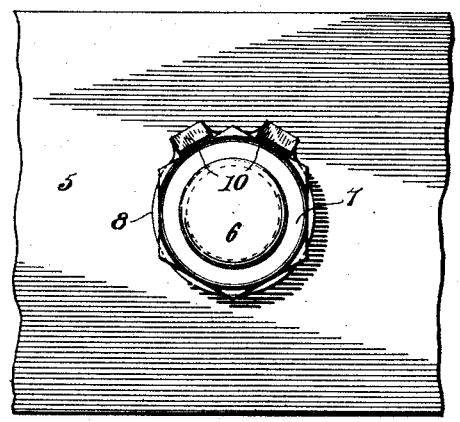
Figure 5:
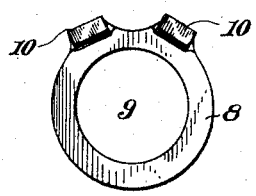
Figure 6:
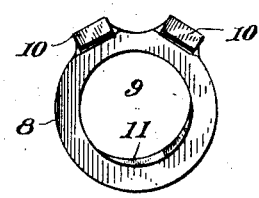

In the drawing, wherein like characters of reference indicate corresponding parts throughout the several views, Figure 1 is an end elevational view of a bolt having a nut and my improved washer operatively disposed thereon and illustrated in connection with members being bolted together, Fig. 2 is a sectional view taken substantially upon line II—II of Fig. 1, Fig. 3 is a view similar to Fig. 1 with the nut and washer positioned prior to the turning home of the nut, Fig. 4 is a side elevational view of the device shown in Fig. 3, Fig. 5 is a top plan view of the locking washer, and Fig. 6 is a similar view of a modification thereof.

Referring to the drawing in detail, 5 indicates a pair of members which are bolted together by means of the bolt 6 and nut 7, said nut being threaded upon the screw threaded end of the bolt 6 after my improved locking washer 8 has been placed thereon, as shown in Fig. 4.

The locking washer 8 comprises a thin body of metal having a central circular aperture 9 of slightly larger diameter than the shank of the bolt 6 so that said washer may be readily slid onto the threaded end of the bolt to engage the adjacent side face of the adjacent bolted member 5. Extending laterally at an obtuse angle to the body of the washer 8 are a pair of spaced rigid tongues 10, as shown, although I may provide one or more than two of the same. By reason of the fact that the tongues 10 are arranged at an obtuse angle, the same present inclined inner faces for engagement with the nut 7 as will become apparent.

As shown in Fig. 6, the washer 8 may be provided with an inwardly projecting sharpened rib 11 for a purpose to be described.

In the use of the present invention, the bolt 6 is inserted through the members 5 and the washer 8 slid onto the end of the bolt 6 into the position shown in Fig. 4, whereupon the nut 7 is threaded upon the bolt 6 until the inner end of said nut engages the inclined faces of the tongues 10 as shown in Figs. 3 and 4. Further rotation of the nut 7 carries the washer 8 around to the position shown in Fig. 1 wherein said washer is somewhat effectively prevented from rotation by frictional engagement with the adjacent member 5 as shown at 12 in Fig. 2. A continuation of the rotation of nut 7 causes the washer 8 to be tilted as shown in Fig. 2 by reason of the engagement of the nut 7 with the tongues 10. Also, there is a slight lateral displacement of the washer 8 so that the latter is caused to dig into and mutilate the threads of the bolt 6 as at 13 in Fig. 2 and thereby firmly retain the washer against rotation. Obviously, the nut 7 is also retained against rotation by reason of the tongues 10 engaging the side faces thereof.

The sharpened rib 11, if provided, is designed to dig into the threads and thereby insure a more positive action than might take place with the washer of Fig. 5.

In practice, the present washer has been found to effectively prevent rotation of nuts subjected to extremely severe vibration and is extremely practical by reason of the fact that no costly modification of standard bolts and nuts is necessary to its use and operation. It will, of course, be understood that the bolt 6 is prevented from turning in any suitable manner while screwing the nut 7 home upon the same as above mentioned.

It is believed that the construction and operation of the present invention as well as the advantages thereof will be readily understood by those skilled in the art, and while the forms of the invention herein shown and described are what are believed to be the preferable embodiments thereof, it is nevertheless to be understood that minor changes may be made in the form, combination and arrangement of parts without departing from the spirit and scope of the invention, as claimed.

What I claim as new is:—

1. A nut locking washer comprising a rigid body of metal having a substantially central circular aperture and provided with a plurality of angularly related spaced rigid marginal tongues extending laterally at an obtuse angle relative thereto, said tongues providing outwardly inclined inner faces.

2. In combination with a member having a bolt extending therethrough and a nut threaded thereon, a washer loosely arranged upon the bolt between the member and the nut and having means engageable by the nut to prevent turning of the latter and to cause tilting of the washer into gripping engagement with the threads of the bolt when the nut is threaded on to the latter.

3. In combination with a member having a bolt extending therethrough and a nut threaded thereon, a washer loosely arranged upon the bolt between the member and the nut and having a rigid tongue engageable by the nut to prevent turning of the latter and to cause tilting of the washer into gripping engagement with the threads of the bolt when the nut is threaded on to the latter.

4. In combination with a member having a bolt extending therethrough and a nut threaded thereon, a washer loosely arranged upon the bolt between the member and the nut and having a rigid tongue engageable by the nut to prevent turning of the latter and to cause tilting of the washer when the nut is threaded onto the bolt, said washer being provided with an inwardly projecting rib arranged to dig into the threads of the bolt when the washer is tilted.

In testimony whereof I affix my signature.

HARRY G. NORWOOD.

Copies of this patent may be obtained for five cents each, by addressing the "Commissioner of Patents, Washington, D. C."